United States Patent [19]

Murayama et al.

[11] Patent Number: 4,894,729

[45] Date of Patent: Jan. 16, 1990

[54] PICTURE ELEMENT DATA GENERATING METHOD

[75] Inventors: Noboru Murayama, Machida; Koichi Suzuki, Yokohama, both of Japan

[73] Assignee: Ricoh Company, Ltd., Japan

[21] Appl. No.: 102,380

[22] Filed: Sep. 28, 1987

[30] Foreign Application Priority Data

| Oct. 2, 1986 [JP] | Japan | 61-235080 |
| Oct. 7, 1986 [JP] | Japan | 61-239919 |
| Oct. 7, 1986 [JP] | Japan | 61-239920 |

[51] Int. Cl.⁴ .............................................. H04N 1/40
[52] U.S. Cl. ...................................... 358/447; 358/448; 358/452
[58] Field of Search ............... 358/280, 287, 260, 283, 358/284, 428, 432, 443, 447, 448, 451, 452; 382/54, 56

[56] References Cited

U.S. PATENT DOCUMENTS

| 4,187,519 | 2/1980 | Vitols | 358/169 |
| 4,258,393 | 3/1981 | Ejiri | 358/283 |
| 4,349,846 | 9/1982 | Sekigawa | 358/283 |
| 4,366,506 | 12/1982 | Ejiri | 358/280 |
| 4,381,547 | 4/1983 | Ejiri | 358/280 |
| 4,484,347 | 11/1984 | Kashioka | 382/54 |
| 4,688,100 | 8/1987 | Haganuma | 358/260 |
| 4,720,745 | 1/1988 | DeForest | 358/283 |
| 4,725,892 | 2/1988 | Suzuki | 358/287 |
| 4,742,399 | 5/1988 | Kitamura | 358/280 |
| 4,776,031 | 10/1988 | Mita | 358/293 |

Primary Examiner—Edward L. Coles, Sr.
Assistant Examiner—Jerome Grant
Attorney, Agent, or Firm—Mason, Fenwick & Lawrence

[57] ABSTRACT

A picture element data generating method comprises the steps of extracting a noticeable pixel and a plurality of reference pixels from image data, the reference pixels being adjacent to the noticeable pixel; and generating a pixel positioned within a minimum polygon which is formed so as to include the noticeable pixel and the reference pixels as vertexes thereof or include the reference pixels as vertexes and the noticeable pixel on a side thereof. A level of the pixel being calculated by use of levels of the noticeable and reference pixels which are weighed.

13 Claims, 6 Drawing Sheets

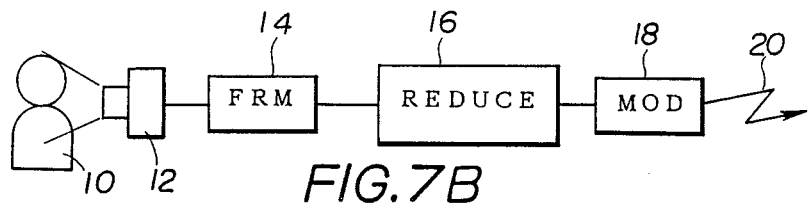
FIG.7A
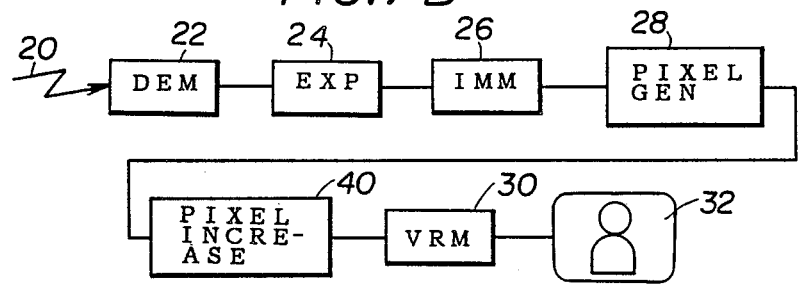
FIG.7B
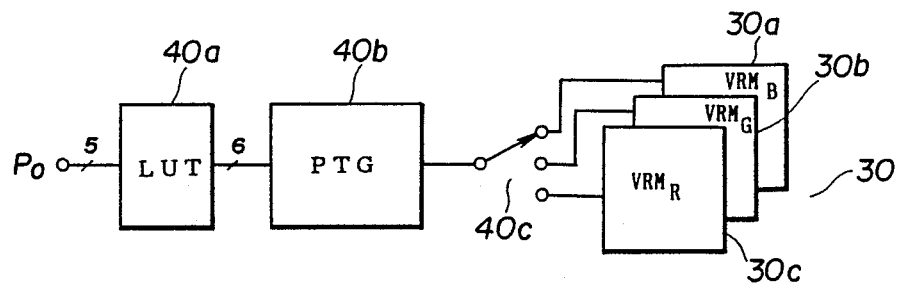
FIG.8
FIG.9A
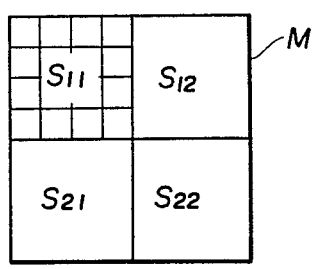
FIG.9B
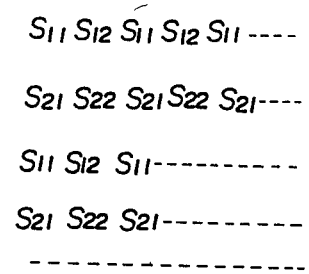

| 58 | 53 | 39 | 28 | 27 | 42 | 54 | 59 |
|----|----|----|----|----|----|----|----|
| 48 | 40 | 21 | 14 | 13 | 20 | 41 | 49 |
| 34 | 22 | 10 | 4  | 3  | 9  | 19 | 35 |
| 29 | 15 | 5  | 1  | 2  | 8  | 18 | 32 |
| 38 | 23 | 11 | 6  | 7  | 12 | 26 | 37 |
| 52 | 45 | 24 | 16 | 17 | 25 | 44 | 51 |
| 62 | 56 | 46 | 30 | 31 | 43 | 55 | 61 |
| 63 | 57 | 47 | 33 | 36 | 50 | 60 | 63 |

| 14 | 24 | 52 | 55 | 53 | 46 | 22 | 12 |
|----|----|----|----|----|----|----|----|
| 34 | 50 | 41 | 27 | 25 | 39 | 48 | 32 |
| 62 | 43 | 19 | 7  | 5  | 17 | 37 | 60 |
| 57 | 29 | 9  | 1  | 3  | 15 | 35 | 63 |
| 54 | 45 | 21 | 11 | 13 | 23 | 51 | 56 |
| 26 | 40 | 47 | 31 | 33 | 49 | 42 | 28 |
| 6  | 18 | 38 | 59 | 61 | 44 | 20 | 8  |
| 4  | 16 | 36 | 63 | 58 | 30 | 10 | 2  |

| 37 | 13 | 9  | 41 | 39 | 15 | 11 | 43 |
|----|----|----|----|----|----|----|----|
| 17 | 1  | 5  | 29 | 19 | 3  | 7  | 31 |
| 53 | 21 | 25 | 49 | 55 | 23 | 27 | 51 |
| 57 | 33 | 45 | 61 | 59 | 35 | 47 | 63 |
| 40 | 16 | 12 | 44 | 38 | 14 | 10 | 42 |
| 20 | 4  | 8  | 2  | 18 | 2  | 6  | 30 |
| 56 | 24 | 28 | 52 | 54 | 22 | 26 | 50 |
| 60 | 36 | 48 | 63 | 58 | 34 | 46 | 62 |

| 54 | 26 | 17 | 48 | 56 | 27 | 19 | 46 |
|----|----|----|----|----|----|----|----|
| 33 | 1  | 9  | 57 | 35 | 3  | 11 | 59 |
| 23 | 41 | 49 | 29 | 21 | 43 | 51 | 31 |
| 15 | 63 | 37 | 5  | 13 | 61 | 39 | 7  |
| 55 | 28 | 20 | 45 | 53 | 26 | 18 | 47 |
| 36 | 4  | 12 | 60 | 34 | 2  | 10 | 58 |
| 22 | 44 | 52 | 32 | 24 | 42 | 50 | 30 |
| 14 | 62 | 40 | 8  | 16 | 63 | 38 | 6  |

PICTURE ELEMENT DATA GENERATING METHOD

BACKGROUND OF THE INVENTION

The present invention generally relates to a picture element data generating method, and in particular to a picture element data generating method in which gradation levels and a number of picture elements can be expanded on the basis of image data composed of small pixels each represented by small gradation levels. The present invention is suited for image data transmission utilizing a narrow frequency band range transmission line such as a public telephone line. The present invention may be applied to a gradation facsimile system, a video conference system, a video telephone system, a videotex or the like.

Recently, image (or picture) transmission has been widely used as a method of data communications. In particular, facsimile communications have become very popular. As well known, a conventional facsimile system is designed so that on a transmitting side, image data read out by a sensor are encoded into a binary level image signal and transmitted, and on a receiving side, the binary level image signal is decoded to the original image data, which is then printed.

Presently, with the progress of image processing techniques, many kinds of image transmission systems other than the conventional facsimile system which handles the binary level image signal, are turned to for practical use. Examples of these are gradation facsimile systems, video conference system, a video phone and a videotex. For example, the gradation facsimile system can transmit a half-tone image other than white and black through a line. That is, the gradation facsimile system converts the image data from the sensor into a multilevel image signal. Also, the video phone can transmit a still picture composed of multilevel image data. As will be anticipated from the above description, the above image transmission systems process a large amount of image data, compared with the conventional facsimile system which processes the binary image data.

Currently, most of these image transmission systems are designed for use on a leased line or a high bit rate line. In other words, these lines have bit rates higher than 9,600 bps (bits per second), which amounts to the bit rate of the public telephone line in Japan. For example, an image transmission system applicable for the video phone based on the leased line having a bit rate of more than 9,600 bps is disclosed in Sato et al, "IMAGE TRANSMISSIONS AND APPARATUSES THEREFOR", Colona Company, 1977. Also, a video conference system and a video phone system are disclosed in H. Yasuda, "WIDE BAND RANGE IMAGE COMMUNICATIONS", Journal of the Institute of Television Engineers of Japan, vol.40, No.7, 1986, pp.655–658. The systems disclosed are predicated on use of the leased line having the bit rate more than 9,600 bps. In other words, these transmission systems are based on a transmission channel of a relatively wide frequency band range.

It is desirable to transmit the image data processed in the video phone system, video conference system or gradation facsimile system through the public telephone line. As mentioned above, the public telephone line employed in Japan has a bit rate of 9,600 bps and is therefore a narrow frequency band range transmission line (in the frequency range of 0.3 to 3.4 kHz). It is now assumed that one frame of a video signal is formed with 512×512 picture elements (hereafter referred to as pixels) and that one pixel is represented with 32 gradation levels (corresponding to 5 bits). When the video signal is a color video signal and is transmitted through the public telephone line having a bit rate of 9,600 bps, time required for transmission of one frame of the color video signal is obtained as follows:

$$3 \times 5 \times 512 \times 512 / 9600 = 409.6 \text{ (sec)}.$$

Therefore, the image transmission under the above condition is not suited for practical use.

For this reason, compression of the image data is generally employed to transmit the image data with high speed. For example, a modified Huffman coding scheme and a modified read coding scheme are widely employed for the compression of the binary image data in the facsimile system. Also, a bit plane coding scheme, a level plane coding scheme and a Markov coding scheme are employed for the compression multilevel image data in the video system, for example.

However, as clearly shown in FIG. 1, the degree of the data compression becomes smaller as the gradation levels (gray levels), or the number of bits representing one pixel increases. Therefore, in addition to the conventional compression schemes, there is used another data compressing method in which part of original image data are intentionally omitted and then compressed in order to facilitate the reduction of the quantity of image data to be transmitted. That is, all of the sampled image data are not used for transmission, but some of them are intermittently extracted from the original sampled image data. For example, when the sampled data at the even numbered sampling times are extracted from all the sampled image data and then transmitted without being compressed, the quantity of the image data to be transmitted becomes half of the quantity of the original image data. In other words, the transmission speed is doubled. In addition, the image data intermittently extracted from the original sampled data is compressed, and the data quantity to be transmitted is further reduced. For example, when one frame of the color video signal having the same size as one frame in the above example (512×512; 32 gradation levels) is sent with 64×64 pixels and 8 gradation levels, a time required for the transmission becomes as follows:

$$3 \times 3 \times 64 \times 64 / 9600 = 3.84 \text{(sec)}.$$

In response to the reduction of the data quantity, it becomes necessary to accurately reproduce the original image from the intermittent image data to obtain a high definition image on the receiving side. Therefore, a pixel data generating method for increasing pixels is used to restore pixel data which are omitted on the transmitting side by means of an interpolation process or the like.

One conventional pixel data generating method is disclosed in the Japanese Laid-Open Pat. Publication No.97,774/1985. This publication discloses an increase of the number of pixel data in which pixels are simply increased without any signal processing. Thereafter, a known dither process is applied to increase pixel data. Although this method can simply increase pixel data, the picture quality of the reproduced image may be affected. Actually, the picture quality of the image reproduced by the above pixel increasing method is substantially the same as that of the image reproduced without using this method.

Another conventional pixel data generating method is proposed in which levels of mutually adjacent pixels are simply averaged and pixels having the averaged level are interpolated, so that the number of pixels is increased. This averaging method can provide a picture quality better than the picture quality provided by the method disclosed in the above publication. However, the averaging method expands only the number of pixels and does not expand the gradation levels. For this reason, it is difficult to obtain a reproduced image of high picture quality. Moreover, it is difficult to obtain a high resolution in the reproduced image in which characters and graphics are mixed.

SUMMARY OF THE INVENTION

Accordingly, a general object of the present invention is to provide a novel and useful picture element data generating method in which the above disadvantages have been eliminated.

A more specific object of the present invention is to provide a picture element data generating method in which gradation levels and the number of pixels can be expanded on the basis of image data composed of a small number of picture elements each composed of small gradation levels to improve the picture quality of a reproduced image, especially of a half-tone image.

Another object of the present invention is to provide a picture element data generating method which is suited for image data transmission through a public telephone line having a bit rate of 9,600 bps or its vicinity.

Still another object of the present invention is to provide a picture element data generating method capable of improving resolution of an image in which characters and graphics are mixed.

To attain the above objects and features, according to the present invention, there is provided a picture element data generating method comprising the steps of extracting a noticeable pixel and a plurality of reference pixels from image data, the refrence pixels being adjacent to the noticeable pixel; and generating a pixel positioned within a minimum polygon which is formed so as to include the noticeable pixel and the reference pixels as vertexes thereof or include the reference pixels as vertexes and the noticeable pixel on a side thereof. The level of the pixel is calculated by use of levels of the noticeable and reference pixels which are weighed.

Other objects and features of the present invention will become apparent from the following detailed description in conjunction with the attached drawings.

BRIEF DESCRIPTION OF THE DRAWINGS

FIGS. 7A and 7B are block diagrams of another video data transmission system in which the pixel data generating method according to the present invention is combined with a conventional pixel increasing process;

FIG. 8 is a block diagram of a pixel increasing circuit employed in the configuration shown in FIG. 7B;

FIGS. 9A and 9B are views for explaining an operation of the pixel increasing circuit shown in FIG. 8;

DETAILED DESCRIPTION

A description will now be given of a first embodiment of the present invention, by referring to FIGS. 2A through 2C.

Figure 2A:
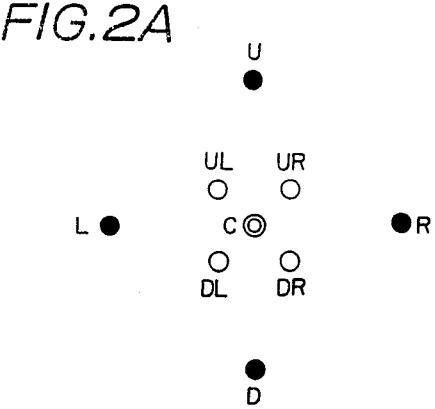
FIGS. 2A through 2C are views for explaining a pixel data generating method according to a first embodiment of the present invention.
Figure 2B:
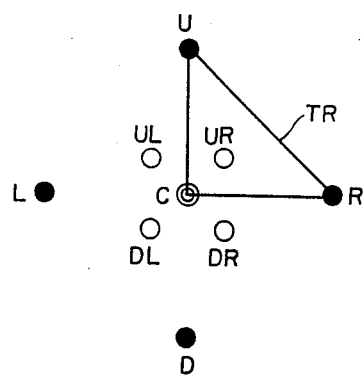
Figure 2C:
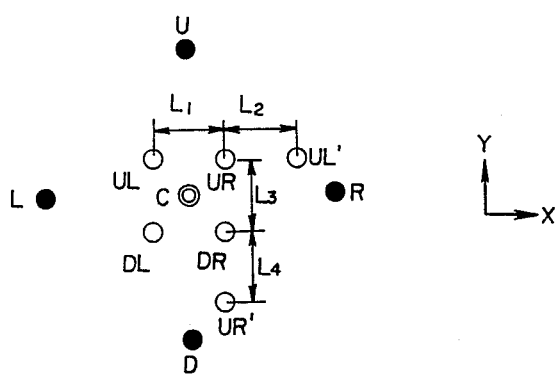

The first embodiment illustrated in FIGS. 2A through 2C is an example in which gradation levels and the number of pixels are expanded by four times those of an inputted pixel. As will be described in detail below, the present invention differs from the conventional interpolation process of pixels. In FIG. 2A, a character C represents a noticeable pixel or its level, and characters U, D, L and R represent reference pixels or their levels on the upper, lower, left and right sides with respect to the noticeable pixel C, respectively. According to the first embodiment, four pixels are generated per one noticeable pixel. In an example illustrated, four pixels UR, UL, DL and DR are generated corresponding to one noticeable pixel C. Levels of four pixels UR, UL, DL, and DR corresponding to the noticeable pixel C are calculated in accordance with the following equations.

$$UR = 2 \times C + (U + R) \quad (1)$$

$$UL = 2 \times C + (U + L) \quad (2)$$

$$DL = 2 \times C + (D + L) \quad (3)$$

$$DR = 2 \times C + (D + R) \quad (4)$$

Four pixels UR, UL, DL and DR generated corresponding to the noticeable pixel C are positioned into the first, second, third and fourth quadrants, respectively when Cartesian or rectangular coordinates are considered in which the center of the pixel C is positioned at the origin of the coordinates. Further, one pixel to be generated is positioned within a minimum polygon (a minimum triangle in this example) including the noticeable pixel C and reference pixels as vertexes thereof. For example, as shown in FIG. 2B, the pixel UR is positioned into the first quadrant and also within a triangle TR formed by connecting the noticeable pixel C and two adjacent reference pixels U and R which are positioned on the upper and right sides with respect to the noticeable pixel C, respectively. A level of the pixel UR is calculated on the basis of the noticeable pixel C and the reference pixels U and R which form a triangle surrounding the pixel UR in accordance with the above equation (1). The above four equations (1) to (4) represent a digital arithmetic calculation. It is assumed that the pixels C, U, D, L and R are each composed of three bits. In other words, each pixel is represented by eight gradation levels. In this case, the calculation $(2 \times C)$ in the above equations means that the data C of three bits is shifted by one bit, or a digit '0' is added to the least significant bit of the data C. Also the calculation (U +R) in the equation (1) produces a carry and therefore an added result becomes composed of four bits. As a result, the added result UR of $(2 \times C)$ and (U+R) becomes composed of five bits. As may be seen from the above description, the gradation levels are expanded from 8(three bits) to 32 (five bits). It should be noted that in this digital calculation, a weighted calculation is carried out. As may be seen from FIG. 2B, that the noticeable pixel C is close to the pixel UR positioned into the first quadrant, as compared with the reference pixels U and R. For this reason, a weight of 2 which is the heaviest weight is provided for the noticeable pixel C, whereas a weight of 1 is provided for each of the reference pixels. That is, the levels of the noticeable and reference pixels are weighed in response to a distance between the noticeable pixel and each of the reference pixels. A weight other than 2 may be selected. However, since the calculation in the above equations is the digital calculation, the weight of 2 is most preferable from the point of view of a circuit configuration.

Similarly, as shown in the equation (2), the level of the pixel UL generated in the second quadrant is calculated with the reference pixels U and L on the upper and left sides, respectively together with the noticeable pixel C. A level of the pixel DL generated in the third quadrant is calculated with the reference pixels L and D together with the noticeable pixel C, as shown in the equation (3). The level of the pixel DR generated in the fourth quadrant is calculated with the reference pixels D and R together with the noticeable pixel C, as shown in the equation (4). It should be noted that in the first embodiment, the noticeable pixel is omitted after the expanding operation of the gradation levels and the number of pixels. In other words, original input image data are not used as pixels for displaying or printing the image data.

In detail, the produced pixels UR, UL, DL and DR has a positional relationship shown in FIG. 2C. In this figure, UL' denotes a pixel which is generated in the second quadrant when the pixel R is a noticeable pixel. Also, UR' denotes a pixel which is produced in the first quadrant when the pixel D is a noticeable pixel. The generated pixels UR and UL are positioned so that a distance $L_1$ between the centers of the pixels UR and UL is identical to the distance $L_2$ between the centers of the pixel UR and UL' in the X direction. In addition, the pixels UR and DR are positioned so that a distance $L_3$ between the centers of the pixels UR and DR is equal to a distance $L_4$ between the centers of the pixels DR and UR' in the Y direction.

As will be appreciated, according to the present invention, the gradation levels and the number of pixels may be effectively expanded.

A description will be given of a second embodiment of the present invention, by referring to FIGS. 3A and 3B. The second embodiment is intended to expand, at the same time the gradation levels by 8 times and the number of pixels by 9 times. According to the second embodiment, nine pixels are generated per one noticeable pixel. Levels of nine pixels UC, UL, UR, CC, CL, CR, DC, DL and DR are calculated in accordance with the following equations.

$$UC = 2 \times C + [U + (L + R)/2] \quad (5)$$

$$UL = 2 \times C + (U + L) \quad (6)$$

$$UR = 2 \times C + (U + R) \quad (7)$$

$$CC = 4 \times C \quad (8)$$

$$CL = 2 \times C + [L + (U + D)/2] \quad (9)$$

$$CR = 2 \times C + [R + (U + D)/2] \quad (10)$$

$$DC = 2 \times C + [D + (L + R)/2] \quad (11)$$

$$DL = 2 \times C + (D + L) \quad (12)$$

$$DR = 2 \times C + (D + R) \quad (13)$$

Figure 1:
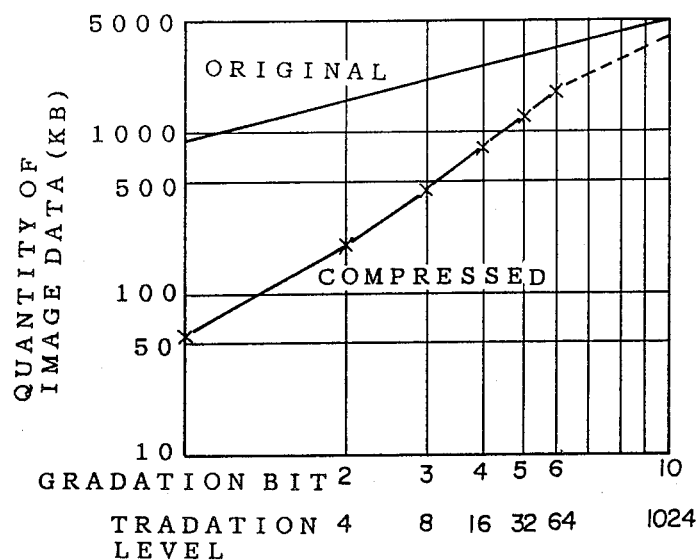
FIG. 1 is a graph showing a relationship between a number of gradation levels (gradation bits) and a quantity of compressed image data.
Figure 3A:
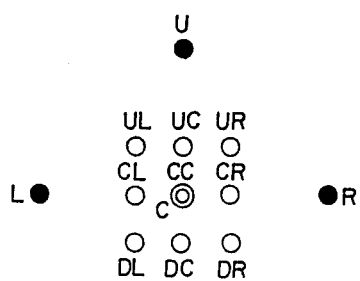
FIGS. 3A and 3B are views for explaining a pixel data generating method according to a second embodiment of the present invention.
Figure 3B:
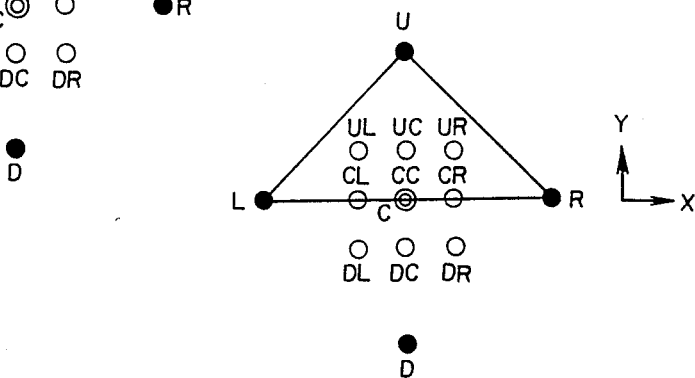

As may be seen from FIG. 3A, nine pixels corresponding to the noticeable pixel C are positioned at an origin of the rectangular coordinates in which the center of the noticeable pixel C is positioned at the origin thereof, on the axes of the coordinates and in the four quadrants of the coordinates. Out of the nine pixels, the pixels UR, UL, DL and DR are the same as those in the first embodiment. Each of the pixels UC, CL, DC and CR are positioned within a minimum polygon (a triangle in the example) in which three reference pixels form vertexes thereof and the noticeable pixel is positioned on one of the sides thereof. The level of the pixels are calculated with levels of pixels at the vertexes. For example, the level of the pixel UC is calculated with the levels of the pixels U, L and R at the three vertexes of the triangle which surrounds the pixel UC, as shown FIG. 3B. In this calculation, a weighed digital calculation is performed. In the equation (5), since the pixel UC is close to the noticeable pixel C compared with the other pixels U, L and R, a heaviest weight of 2 is multiplied to the level of the noticeable pixel. In addition, since the pixel U is closer to the pixel UC than the other pixels L and R, a medium weight of 1 is multiplied to the level of the pixel U. Moreover, since the pixels L and R are distant from the pixel UC, a smallest weight of ½ is respectively provided thereto. It should be noted that in the second embodiment, the noticeable pixel is not omitted but used as pixel data which forms the image to be displayed or printed. In this regard, the second embodiment differs from the first embodiment.

As described above, according to the second embodiment, the gradation levels can be expanded by eight times when the noticeable and reference pixels are each made up of three bits, and at the same time the number of pixels can be expanded by nine times.

Moreover, it is possible to generate 16 pixels (4×4 pixels) corresponding to one noticeable pixel. In this case, first of all, four pixels corresponding to one noticeable pixel are generated according to the first embodiment described previously. Then, the first embodiment is further applied to each generated pixel set to the noticeable pixel. As a result, 16 pixels (4×4 pixels) may be generated corresponding to one original pixel.

According to the first and second embodiments, it is possible to effectively improve the picture quality of the half-tone image. However, when the image data includes both characters and graphics, there is a possibility that the resolution of the reproduced image will be degraded. This is because that the characters are clearly displayed or printed by using a binary level data rather than multilevel image data. Third and fourth embodiments which are described below are intended to eliminate this possibility for the first and second embodiments respectively, and to display or print with high resolution an image including both characters and graphics.

For this purpose, according to the third embodiment, the calculation by the above equations (1) to (4) is performed when the difference in the gradation level between the noticeable pixel and the reference pixels is relatively small, whereas calculation of pixel data to be produced corresponding to the noticeable pixel is performed so as to enlarge the difference in the gradation level when the difference in the gradation is relatively large. Similarly, the calculation may be carried out in the fourth embodiment. Detailed conditions and calculating equations for each pixel to be generated of the noticeable pixel in the third and fourth embodiments are listed below.

the range of 1/16 to ½ of the maximum density in the third and fourth embodiments.

A description will be given of an example of a video data transmission system in which the picture element data generating method of the present invention is used.

Figure 4A:
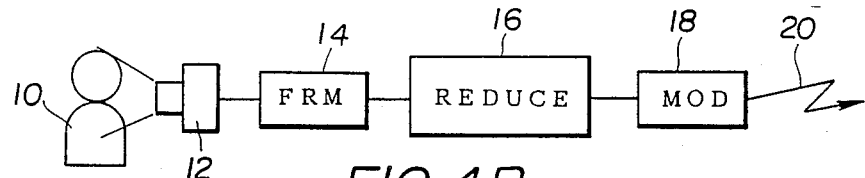
FIGS. 4A and 4B are block diagrams of a video data transmission system in which a pixel data generating method according to the present invention is employed.
Figure 4B:
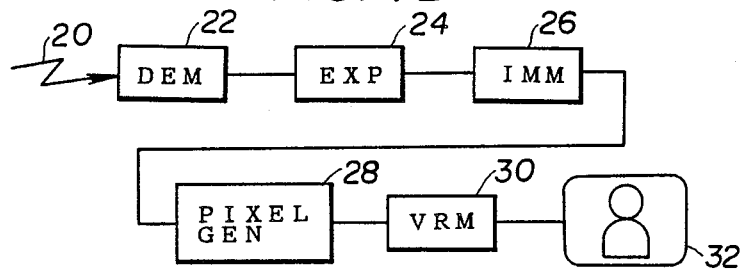

FIG. 4A is a block diagram of a transmitting system of the video data transmission system, and FIG. 4B is a block diagram of a receiving system thereof. Referring to FIG. 4A, video data 10 of one frame which is picked up by an electronic still camera or a television camera 12 is supplied to a frame memory 14. The frame memory 14 may be constituted by a random access memory (RAM). The frame memory 14 temporarily stores the video data 10. Then, the video data 10 is fed to a data reducing circuit 16, which intermittently extracts the video data from the frame memory 14 in order to reduce the quantity to be transmitted. Preferably, intermittent video data is compressed by encoding in order to facilitate the reduction of the quantity to be transmitted. The encoding by the data reducing circuit 16 may be selected from among many conventional encoding schemes. An output signal of the data reducing circuit 16 is supplied to a modulator 18, which modulates a carrier signal within a frequency range of a public telephone line 20 in response to the output signal of the data reducing circuit 16. An output signal of the modulator 18 is sent to a demodulator 22 in the receiving system illustrated in FIG. 4B through the public telephone line 20.

| Pixel | Condition | :Calculation |
|---|---|---|
| | 4 Multiple Pixel Conversion | |
| UL: | $2 \times C - (U + L) > T$ | :UL = 4C |
| | $2 \times C - (U + L) < -T$ | :UL = C/4 |
| | Others | :UL = $2 \times C + (U + L)$ |
| UR: | $2 \times C - (U + R) > T$ | :UR = 4C |
| | $2 \times C - (U + R) < -T$ | :UR = C/4 |
| | Others | :UR = $2 \times C + (U + R)$ |
| DL: | $2 \times C - (D + L) > T$ | :DL = 4C |
| | $2 \times C - (D + L) < -T$ | :DL = C/4 |
| | Others | :DL = $2 \times C + (D + L)$ |
| DR: | $2 \times C - (D + R) > T$ | :DR = 4C |
| | $2 \times C - (D + R) < -T$ | :DR = C/4 |
| | Others | :DR = $2 \times C + (D + R)$ |
| | 9 Multiple Pixel Conversion | |
| UL: | $2 \times C - (U + L) > T$ | :UL = 4C |
| | $2 \times C - (U + L) < -T$ | :UL = C/4 |
| | Others | :UL = $2 \times C + (U + L)$ |
| UR: | $2 \times C - (U + R) > T$ | :UR = 4C |
| | $2 \times C - (U + R) < -T$ | :UR = C/4 |
| | Others | :UR = $2 \times C + (U + R)$ |
| UC: | $2 \times C - [U + (L + R)/2] > T$ | :UC = 4C |
| | $2 \times C - [U + (L + R)/2] < -T$ | :UC = C/4 |
| | Others | :UC = $2 \times C + [U + (L + R)/2]$ |
| CL: | $2 \times C - [L + (U + D)/2] > T$ | :CL = 4C |
| | $2 \times C - [L + (U + D)/2] < -T$ | :CL = C/4 |
| | Others | :CL = $2 \times C + [L + (U + D)/2]$ |
| CR: | $2 \times C - [R + (U + D)/2] > T$ | :CR = 4C |
| | $2 \times C - [R + (U + D)/2] < -T$ | :CR = C/4 |
| | Others | :CR = $2 \times C + [R + (U + D)/2]$ |
| CC: | | :CC = 4C |
| DL: | $2 \times C - (D + L) > T$ | :DL = 4C |
| | $2 \times C - (D + L) < -T$ | :DL = C/4 |
| | Others | :DL = $2 \times C + (D + L)$ |
| DR: | $2 \times C - (D + R) > T$ | :DR = 4C |
| | $2 \times C - (D + R) < -T$ | :DR = C/4 |
| | Others | :DR = $2 \times C + (D + R)$ |
| DC: | $2 \times C - [D + (L + R)/2] > T$ | :DC = 4C |
| | $2 \times C - [D + (L + R)/2] < -T$ | :DC = C/4 |
| | Others | :DC = $2 \times C + [D + (L + R)/2]$ |

T is a level for determinimimg whether the difference in the level between the noticeable pixel and the reference pixels is small or large. The value T is preferably in The demodulator 22 demodulates the received analog signal into a corresponding digital signal, which is fed to a data expander 24. The data expander 24 decodes the digital signal from the demodulator 22 into video data. This video data corresponds to the video data which is intermittently extracted from the frame memory 14 in the transmitting side. The decoded video data is supplied to an image memory 26, which temporarily stores the video data therein. Thereafter, one frame of the video data is read out from the image memory 26 and is fed to a pixel data generating circuit 28. The pixel data generating circuit 28 carries out the pixel data generating method described in the foregoing.

Figure 5A:
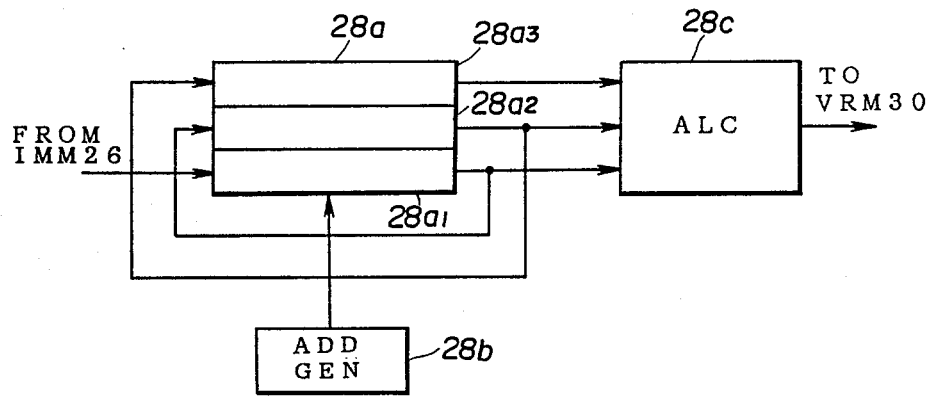
FIG. 5A is a circuit diagram of a pixel data generating circuit for carrying out the pixel data generating method shown in FIGS. 2A through 2C.
Figure 5B:
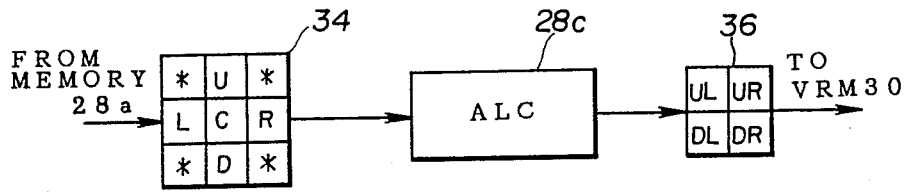
FIG. 5B is a view for explaining an operation of an arithmetic circuit in the pixel data generating circuit shown in FIG. 5A.

FIG. 5A is a circuit diagram of the pixel data generating circuit 28. As illustrated in this figure, the pixel data generating circuit 28 is composed of a memory 28a, an address generator 28b and an arithmetic circuit 28c. The memory 28a consists of three memory regions $28a_1$, $28a_2$ and $28a_3$, which store data amounting to three consecutive horizontal scanning lines. The memory 28a may be formed with a RAM. An input terminal of the memory region $28a_1$ is coupled to the output terminal of the image memory 26. An output terminal of the memory region $28a_1$ is connected to an input terminal of the memory region $28a_2$ as well as an input terminal of the arithmetic circuit 28c. An output terminal of the memory region $28a_2$ is connected to an input terminal of the memory region $28a_3$ as well as an input terminal of the arithmetic circuit 28c. The address generator 28b supplies the memory region 28a with an address signal. In response to the address signal, the memory region $28a_1$ receives a video data amounting to one scanning line which is outputted by the image memory 26. Before this writing operation, the video data which is stored in the memory regions $28a_1$ and $28a_2$ is transferred to the memory regions $28a_2$ and $28a_3$, respectively in response to the address signal from the address generator 28b. Thereafter, the memory 28a outputs video data 34 to the arithmetic circuit 28c, as shown in FIG. 5B. In detail, the video data 34 from the memory 28a is composed of the noticeable pixel C and the reference pixels U, L, D and R. These pixels are each composed of three bits (8 gradation levels), for example. The pixel U is read out from the memory region $28a_3$. The pixels R, C and L are read out from the memory region $28a_2$. The pixel D is read out from the memory region $28a_1$. A symbol * means a data which is not used at the time of generating four pixels corresponding to the noticeable pixel C. At this time, since the writing operation of the memory 28c is ingibited, the data read out therefrom is supplied only to the arithmetic circuit 28c. The arithmetic circuit 28c calculates levels of new pixels UR, UL, DL and DR in accordance with the equations (1) to (4) described in the foregoing. Four pixel data 36 which are generated corresponding to the noticeable pixel C are then fed to a video memory 30. The pixels UR, UL, DL and DR are each composed of five bits (32 gradation levels) in this example. Similarly, one noticeable pixel and four reference pixels are read out from the memory 28a and new four pixels corresponding to the noticeable pixel are generated.

The pixel data generated by the pixel data generating circuit 28 are fed to the video memory 30 and stored therein. Thereafter, the pixel data amounting to one frame of the video signal is supplied to a display apparatus 32 such as a cathode ray tube and a reproduced image is displayed.

In the above operation, the arithmetic circuit 28c may be configured so as to carry out the equations (5) to (13). Moreover, the arithmetic circuit 28c may be configured so as to carry out the calculating operation of the third or fourth embodiment of the present invention described in the foregoing.

Figure 6A:
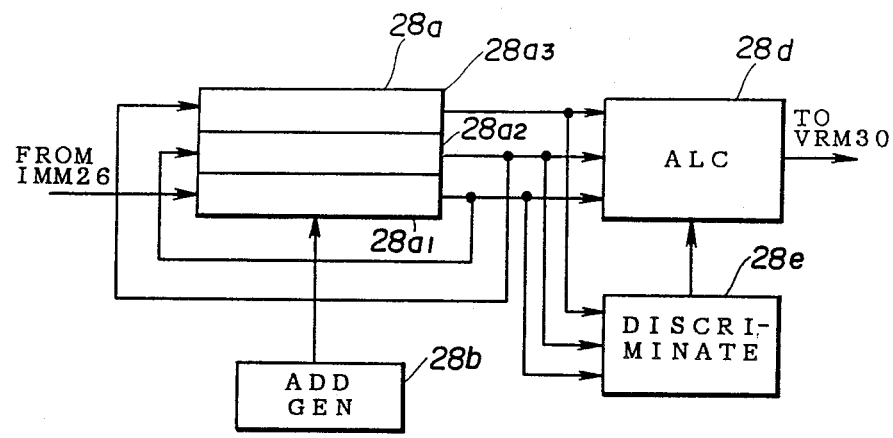
FIG. 6A is a circuit diagram of another pixel data generating circuit for carrying out the pixel data generating method shown in FIGS. 3A and 3B.
Figure 6B:
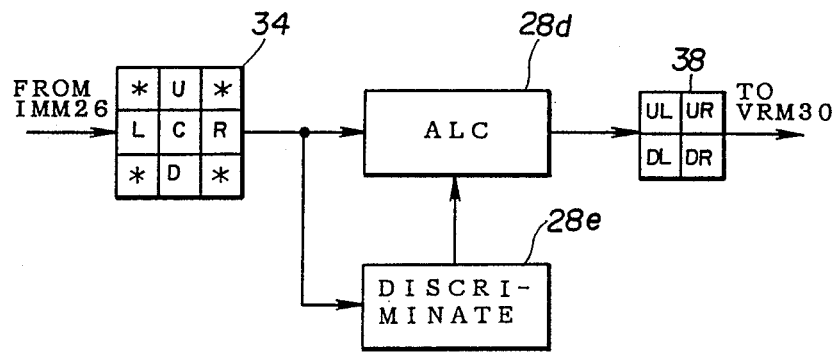
FIG. 6B is a view for explaining an operation of an arithmetic circuit in the pixel data generating circuit shown in FIG. 6A.

FIG. 6A illustrates a circuit configuration of the pixel data generating circuit 28 where the third or fourth embodiments are applied to the video data transmission system. In this case, the pixel data generating circuit 28 is composed of the memory 28a, the address generator 28b, an arithmetic circuit 28d and a discriminating circuit 28e. The memory 28a and the address generator 28b are the same as those in FIG. 5A. The discriminating circuit 28e discriminates the difference in the gradation level between the noticeable pixel and the reference pixels for each pixel to be generated. The concrete conditions for discrimination in the cases of the 4 multiple pixel conversion and 9 multiple pixel conversion have been described. The discriminating circuit 28e provides the arithmetic circuit 28d with a discriminated result. The arithmetic circuit 28d calculates levels of pixels to be generated on the basis of the discriminated result. For example, regarding the pixel UL, when $2 \times C - (U+L) < -T$, the arithmetic circuit 28d outputs the pixel UL of the value C/4. Similarly, Levels of the remaining pixels may be calculated. Then, four pixels 38 shown in FIG. 6B are generated corresponding to one noticeable pixel in the third embodiment. In the fourth embodiment, nine pixels are generated corresponding to one noticeable pixel. The pixels thus generated are fed to the video memory 30. According to the third and fourth embodiments, an excellent resolution is obtainable even when characters and graphics are mixed in the image to be reproduced.

The pixel data generating method of the present invention may be used together with a conventional pixel increasing method such as a sub-matrix method.

FIGS. 7A and 7B show an example of this. In these figures, the same elements as those in the previous figures are denoted by the same reference numerals. As will be apparent from comparison of FIGS. 7A and 7B with FIGS. 4A and 4B, the construction of the transmitting system in FIG. 7A is exactly the same as that in FIG. 4A, whereas in the construction of the receiving system in FIG. 7B a pixel increasing circuit 40 is added to the circuitry of FIG. 4B.

The pixel increasing circuit 40 includes a look-up table circuit 40a, a gradation pattern generator 40b and a switch 40c. The output data of the pixel data generating circuit 28 are supplied to the look-up table circuit 40a. As mentioned above, each pixel data from the pixel data generating circuit 28 is composed of five bits (32 gradation levels), for example. The look-up table may be formed by a shift register for shifting the input data by one bit. In this case, one bit '0' is added to the least significant bit of the pixel data (5bits) from the pixel data generating circuit 28. Therefore, pixel data composed of six bits is produced by the look-up table circuit 40a and is supplied to the pattern generator 40b. The pattern generator 40b has four kinds of gradation patterns shown in FIGS. 10A through 10D. These gradation patterns have 64 gradation levels. Hatchings in each gradation pattern indicate the gradation levels in the range of 1 to 32. By use of these hatchings, a tone of gradation in each pattern may be seen. One of the four qradation patterns is previously selected in accordance with a desirable tone of gradation. The pattern generator 40b outputs the selected gradation pattern corresponding to the input pixel data. The output operation of the selected gradation pattern is varied in accordance with a magnification of pattern. A case is now considered such that 4×4 pixels are generated corresponding to one pixel, with reference to FIGS. 9A and 9B. In FIG. 9A, M represents 8×8 matrix of one gradation pattern which acts to determine the gradation pattern of an enlarged image. Also, $S_{11}$, $S_{12}$, $S_{21}$ and $S_{22}$ represent sub-matrixes of 4×4 which are parts of the gradation pattern M. The consecutive pixel data selectively correspond to one of the sub-matrixes in accordance with a predetermined order. This predetermined order is based on a matrix shown in FIG. 9B in which sub-matrix numbers $S_{11}$, $S_{12}$, $S_{21}$ and $S_{22}$ are arranged. For example, the consecutive pixel data correspond to sub-matrixes $S_{11}$, $S_{12}$, $S_{11}$, $S_{12}$,... in accordance with the matrix shown in FIG. 9B and a corresponding matrix part of the matrix M, or a corresponding sub-matrix is successively outputted. The outputted pattern is selectively supplied to one of memories 30a, 30b and 30c of the video memory 30 through the switch 40c. And the enlarged pattern is displayed by the display apparatus 32.

In the operation mentioned above, it is assumed that one frame of the video signal sent from the transmitting system in FIG. 7A has 8 gradation levels (3 bits) and 64×64 pixels. As mentioned above, one pixel data of 3 bits is converted into four pixel data each consisting of 5 bits by the pixel data generating circuit 28. Therefore, one frame of the video data which is outputted from the pixel data generating circuit 28 has 32 gradation levels and 128×128 pixels. Further, each pixel of 5 bits from the pixel data generating circuit 28 is converted into 4×4 pixels by means of the sub-matrix method. As a result, 128×128 pixels from the pixel data generating circuit 28 are further converted into 512×512 pixels each having 32 gradation levels by the pixel increasing circuit 40 and is displayed. As well known, 16–32 gradation levels are sufficient for a color picture plane using 512×512 pixels. Therefore, even when the color video data having 8 gradation levels and 64×64 pixels per one frame is transmitted through the public telephone line having the bit rate of 9,600 bps, an image of a high definition may be obtained. A time of approximately 3.84 (sec) is required for transmitting the above color video data as described previously. However, when this color video data is further converted into a luminance signal and color-difference signals at the time of the transmission, it is possible to send one frame of the video signal having 8 gradation levels and 64×64 pixels within 1–2 (sec). Therefore, according to the present invention, transmission of television pixels is actually possible by use of the public telephone line without using the high bit rate line.

Figures 10A, 10B, 10C, 10D, 11:
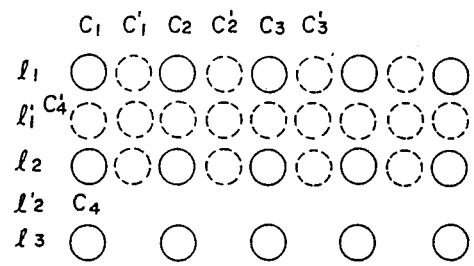
FIGS. 10A through 10D are views showing gradation patterns which are stored in a gradation pattern generator shown in FIG. 8.
FIG. 11 is a view for explaining another conventional pixel increasing process which may be uséd in combination with the present invention.

In the configuration shown in FIG. 7B, another pixel increasing method other than the sub-matrix method may be used therefor. FIG. 11 shows another pixel increasing method. This method carries out a conversion of the pixel density on the basis of the interpolation to enlarge the size of the pattern. In FIG. 11, circles represented by solid lines denote input pixels and circles represented by broken lines denote interpolated pixels. In this method, first, two mutually adjacent pixel data in each scanning line are averaged and a pixel data obtained is interpolated therebetween. For example, pixel data $C_1$ and $C_2$ in a line $l_1$ are averaged and a new pixel $C_1$ having the averaged value of the pixel data $C_1$ and $C_2$ is interpolated therebetween. Secondly, two mutually adjacent pixel data on mutually adjacent lines are averaged and a pixel data obtained is interpolated. For example, pixel data $C_1$ and $C_4$ are averaged and a new pixel $C_4$ having the averaged value is interpolated therebetween. This method, which is suited to a display apparatus which carries out a multilevel display operation, may also be combined with the present invention.

The present invention is not limited to the embodiment described in the foregoing, but various variations and modifications may be made without departing the scope of the present invention.

What is claimed is:

1. A picture element data generating method comprising the steps of:
   extracting a noticeable pixel and a plurality of reference pixels from image data of first numbers(s) of gradation levels, said reference pixels being adjacent to said noticeable pixel;
   generating a pixel positioned within a closed minimum polygon formed by a least number of line segments, said polygon being formed so as to include said noticeable pixel and said reference pixels as vertexes thereof or to include said reference pixels as vertexes and said noticeable pixel on a line segment thereof, a gradation level of said pixel being calculated by use of weighted gradation levels of said noticeable and reference pixels; and
   repeating said generating step to generate a plurality of pixels of second number(s) of gradation levels around said noticeable pixel by forming a plurality of closed minimum polygons, each said minimum polygon including said noticeable pixel, so that the gradation of said image data can be represented by an increased number of gradation levels.

2. A picture element data generating method as claimed in claim 1, wherein said weighted gradation levels of said noticeable and reference pixels are weighed corresponding to a distance between said generated pixel and each of said noticeable and reference pixels.

3. A picture element data generating method as claimed in claim 1, wherein four pixels are generated corresponding to said one noticeable pixel and are respectively positioned in four quadrants of rectangular coordinates, at an origin of which is positioned at said noticeable pixel.

4. A picture element data generating method as claimed in claim 3, wherein said levels of four pixels are calculated in accordance with the following equations:

$$UR = 2 \times C + (U + R)$$

$$UL = 2 \times C + (U + L)$$

$$DL = 2 \times C + (D + L)$$

$$DR = 2 \times C + (D + R)$$

Where C is a level of said noticeable pixel, R, U, L and D are levels of said reference pixels and UR, UL, DL and DR are levels of pixels generated in the first, second, third and fourth quadrants of said rectangular coordinates, respectively.

5. A picture element data generating method as claimed in claim 1, wherein nine pixels are generated corresponding to said one noticeable pixel, and wherein four of said nine pixels are respectively positioned in four quadrants of rectangular coordinates, at an origin of which is positioned at said noticeable pixel, and wherein the other four of said nine pixels are positioned on axes of said coordinates and the remaining one of said nine pixels is positioned at said origin.

6. A picture element data generating method as claimed in claim 5, wherein the levels of said nine pixels are calculated in accordance with the following equations:

$$UC = 2 \times C + [U + (L+R)/2]$$

$$UL = 2 \times C + (U+L)$$

$$UR = 2 \times C + (U+R)$$

$$CC = 4 \times C$$

$$CL = 2 \times C + [L + (U+D)/2]$$

$$CR = 2 \times C + [R + (U+D)/2]$$

$$DC = 2 \times C + [D + (L+R)/2]$$

$$DL = 2 \times C + (D+L)$$

$$DR = 2 \times C + (D+R)$$

Where C is a level of said noticeable pixel, and R, U, L and D are levels of said reference pixels, and UC, UL, UR, CC, CL, CR, DC, DL and DR are levels of said nine pixels, in which a pixel of CC is positioned at said origin, and pixels of UC, UL, DC and CR are positioned on said axes, and pixels of UR, RL, DL and DR are positioned in said four quadrants of said rectangular coordinates.

7. A picture element data generating method as claimed in claim 1, wherein the weighted gradation levels of said noticeable and reference pixels are weighed corresponding to a difference in the level between said noticeable pixel and said reference pixels, and wherein when said level difference exceeds a predetermined level, a weight is provided so as to emphasize said level difference.

8. A picture element data generating method as claimed in claim 7, wherein four pixels are generated corresponding to said one noticeable pixel, and levels of said four pixels are calculated in accordance with the following equations:

| Pixel | Condition | Calculation |
|---|---|---|
| UL: | $2 \times C - (U+L) > T$ | $UL = 4C$ |
|  | $2 \times C - (U+L) < -T$ | $UL = C/4$ |
|  | Others | $UL = 2 \times C + (U+L)$ |
| UR: | $2 \times C - (U+R) > T$ | $UR = 4C$ |
|  | $2 \times C - (U+R) < -T$ | $UR = C/4$ |
|  | Others | $UR = 2 \times C + (U+R)$ |
| DL: | $2 \times C - (D+L) > T$ | $DL = 4C$ |
|  | $2 \times C - (D+L) < -T$ | $DL = C/4$ |
|  | Others | $DL = 2 \times C + (D+L)$ |
| DR: | $2 \times C - (D+R) > T$ | $DR = 4C$ |
|  | $2 \times C - (D+R) < -T$ | $DR = C/4$ |
|  | Others | $DR = 2 \times C + (D+R)$ |

Where T is a level for determining whether the difference in the level between the noticeable pixel and the reference pixels is small or large, and C is a level of said noticeable pixel, and R, U, L and D are levels of said reference pixels and UR, UL, DL and DR are levels of pixels generated in the first, second, third and fourth quadrants of said rectangular coordinates, respectively.

9. A picture element data generating method as claimed in claim 7, wherein nine pixels are generated corresponding to said one noticeable pixel, and levels of said nine pixels are calculated in accordance with the following equations:

| Pixel | Condition | Calculation |
|---|---|---|
| UL: | $2 \times C - (U+L) > T$ | $UL = 4C$ |
|  | $2 \times C - (U+L) < -T$ | $UL = C/4$ |
|  | Others | $UL = 2 \times C + (U+L)$ |
| UR: | $2 \times C - (U+R) > T$ | $UR = 4C$ |
|  | $2 \times C - (U+R) < -T$ | $UR = C/4$ |
|  | Others | $UR = 2 \times C + (U+R)$ |
| UC: | $2 \times C - [U + (L+R)/2] > T$ | $UC = C/4$ |
|  | :Others | $UC = 2 \times C + [U + (D+L)/2]$ |
| CL: | $2 \times C - [L + (U+D)/2] > T$ | $CL = 4C$ |
|  | $2 \times C - [L + (U+D)/2] < -T$ | $CL = C/4$ |
|  | Others | $CL = 2 \times C + [L + (U+D)/2]$ |
| CR: | $2 \times C - [R + (U+D)/2] > T$ | $CR = 4C$ |
|  | $2 \times C - [R + (U+D)/2] < -T$ | $CR = C/4$ |
|  | Others | $CR = 2 \times C + [R + (U+D)/2]$ |
| CC: |  | $CC = 4C$ |
| DL: | $2 \times C - (D+L) > T$ | $DL = 4C$ |
|  | $2 \times C - (D+L) < -T$ | $DL = C/4$ |
|  | Others | $DL = 2 \times C + (D+L)$ |
| DR: | $2 \times C - (D+R) > T$ | $DR = 4C$ |
|  | $2 \times C - (D+R) < -T$ | $DR = C/4$ |
|  | Others | $DR = 2 \times C + (D+R)$ |
| DC: | $2 \times C - [D + (L+R)/2] > T$ | $DC = 4C$ |
|  | $2 \times C - [D + (L+R)/2] < -T$ | $DC = C/4$ |
|  | Others | $DC = 2 \times C + [D + (L+R)/2]$ |

Wherein T is a level for determining whether the difference in the level between the noticeable pixel and the reference pixels is small or large, and C is a level of said noticeable pixel, and R, U, L and D are levels of said reference pixels, and UC, UL, UR, CC, CL, CR, DC, DL and DR are levels of said nine pixels, in which a pixel of CC is positioned at said origin, and pixels of UC, UL, DC and CR are positioned on said axes, and pixels of UR, RL, DL and DR are positioned in said four quadrants of said rectangular coordinates.

10. A picture element data generating method as claimed in claim 1, wherein said image data is a data obtained by demodulating modulated image data.

11. A picture element data generating method as claimed in claim 1, wherein said image data is data obtained by demodulating and expanding compressed and modulated image data.

12. A picture element data generating method as claimed in claim 1, wherein said image data is facsimile data.

13. A picture element data generating method as claimed in claim 1, wherein said image data is color video data.

* * * * *